Aug. 22, 1944.  P. H. BURDETT ET AL  2,356,212
MEASURING DEVICE
Filed Aug. 25, 1942   3 Sheets-Sheet 1

INVENTORS
Philip H. Burdett
Warren S. Reynolds
John R. Turner
BY
ATTORNEYS

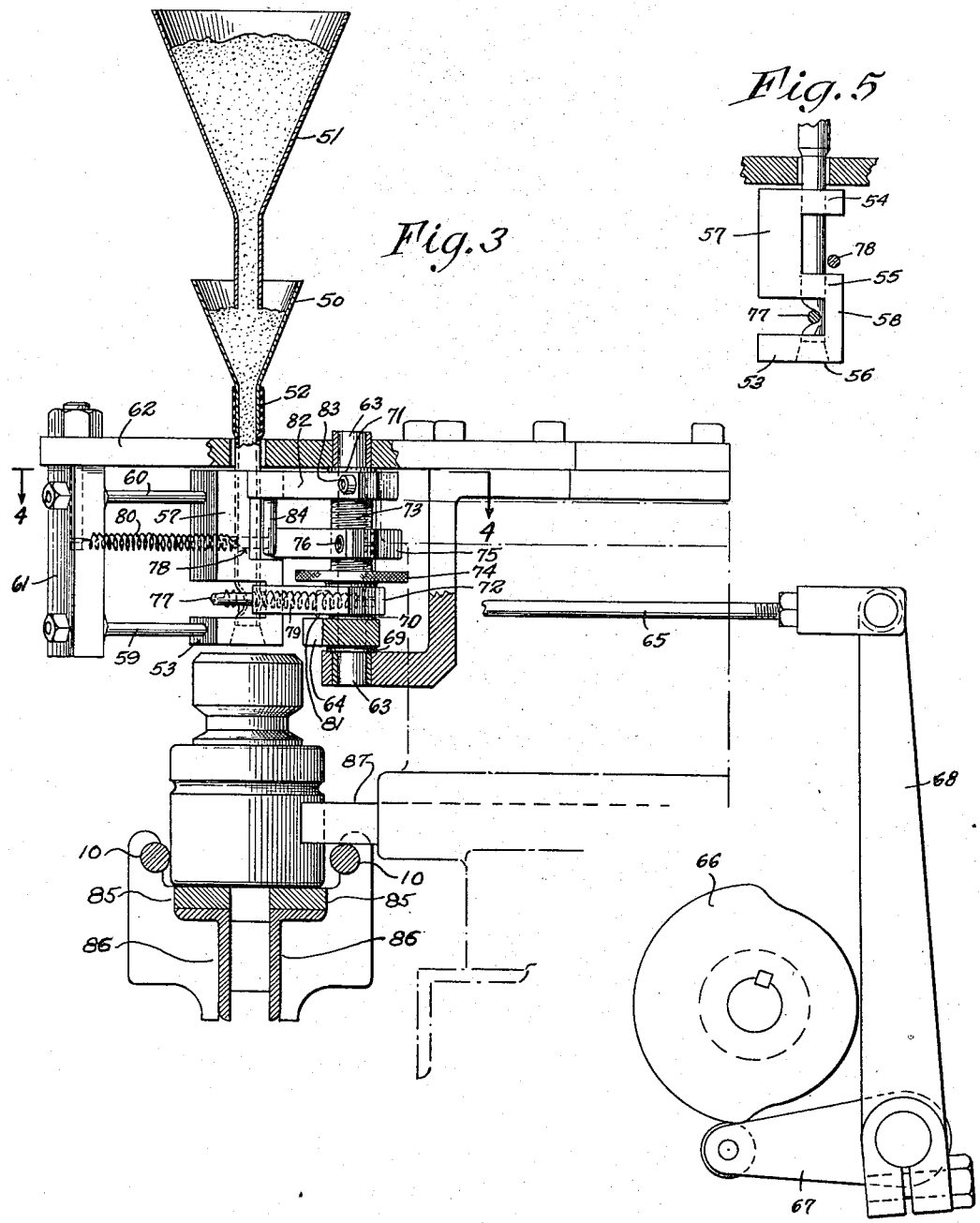

Patented Aug. 22, 1944

2,356,212

UNITED STATES PATENT OFFICE 2,356,212

MEASURING DEVICE

Philip H. Burdett, Bridgeport, Warren S. Reynolds, Stratford, and John R. Turner, Milford, Conn., assignors to Remington Arms Company, Inc., Bridgeport, Conn., a corporation of Delaware Application August 25, 1942, Serial No. 455,990

7 Claims. (Cl. 221—113)

This invention relates to a device for measuring quantities of a freely flowable material and is particularly adapted for use in feeding of measured charges of a granular material or mixture used in filling tracer or incendiary projectiles of the small arms variety.

Materials of the type mentioned frequently must accurately be measured and fed to a container. It is also desirable that the quantities exposed be relatively small so as to avoid explosive hazards. The measuring means must also be one which eliminates, as far as possible, all dangers of explosion which might be caused by friction or by impact.

The device will be particularly described in its use in charging tracer or incendiary materials, mixtures or compounds to small arms projectiles, but it is to be understood that it is suitable for other uses.

One of the commonly employed methods of measuring and loading such mixtures is by the use of a scoop dipping into a bag containing the mixture. The scoop is raised out of the mixture, following which it is carried to a funnel or chute over the projectile. Such a method of loading involves a considerable quantity of very highly inflammable substances with the consequent explosive hazard.

One of the objects of this invention is to eliminate the explosive hazard in loading such a mixture.

Other objects of the invention will appear from the following description and drawings which are not to be construed as to be limiting.

Fig. 3 is an elevational view partially in section of another form of the invention.

Fig. 5 is a fragmentary view looking in the direction 5—5 of Fig. 4, showing a detail of the supporting bracket.

The present invention employs a collapsible tube with two spaced compressors operating upon the tube and compressing the same. First the bottom of the tube is closed and then the top is shut off from communication with a source of supply. The lower compressor is released thereafter to allow the measured quantity between the two compressors to escape from the bottom of the tube.

By the employment of the tube and compressor arrangement, such as will be described, the quantities of material exposed at any time may be made relatively small. The use of the rubber tube and compressor, together with a yieldable means for operating the compressor, does away with any danger of impact or friction igniting the material itself.

Figure 1:
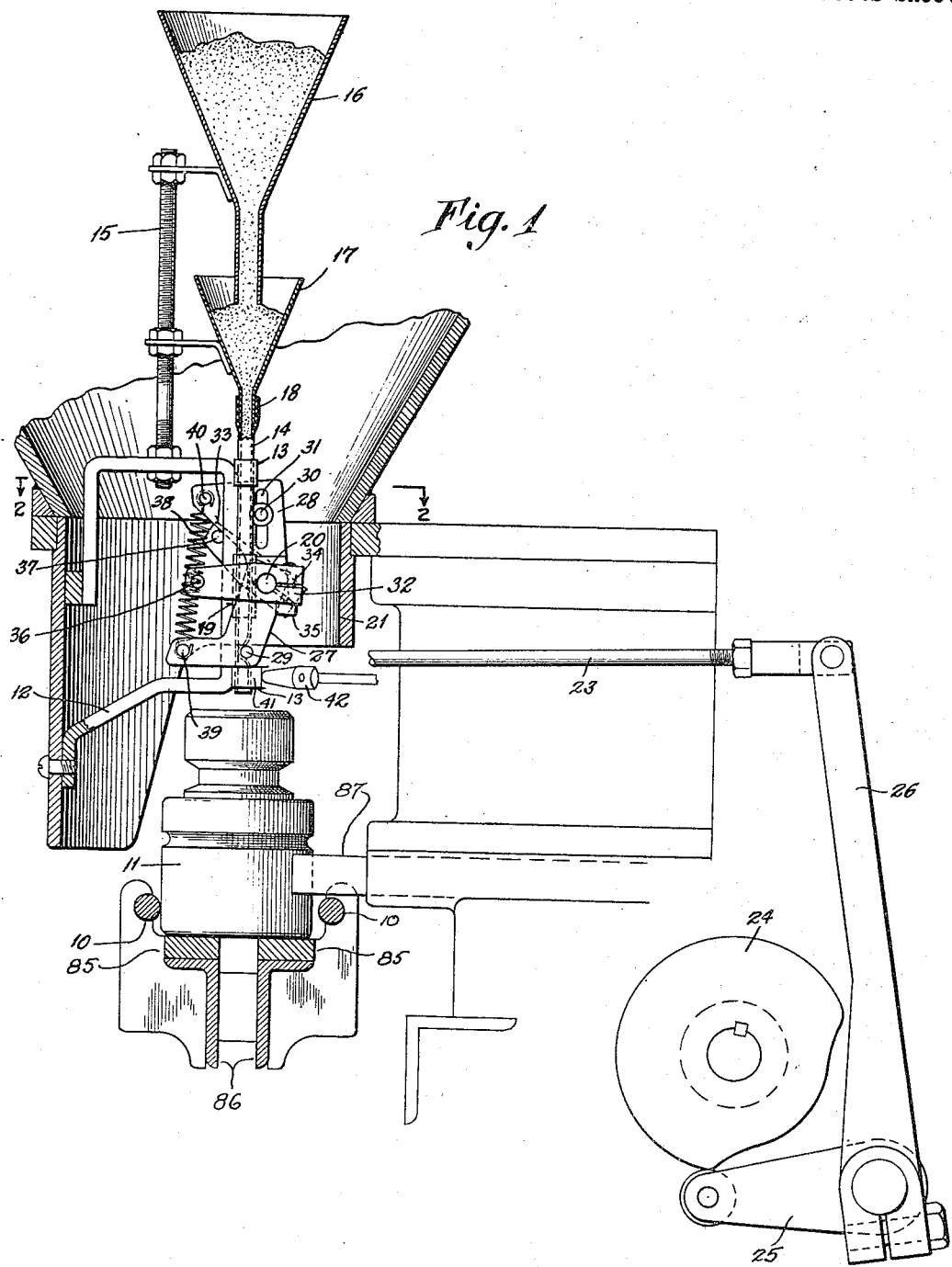
Fig. 1 is an elevational view partially in section of one form of the invention.
Figure 2:
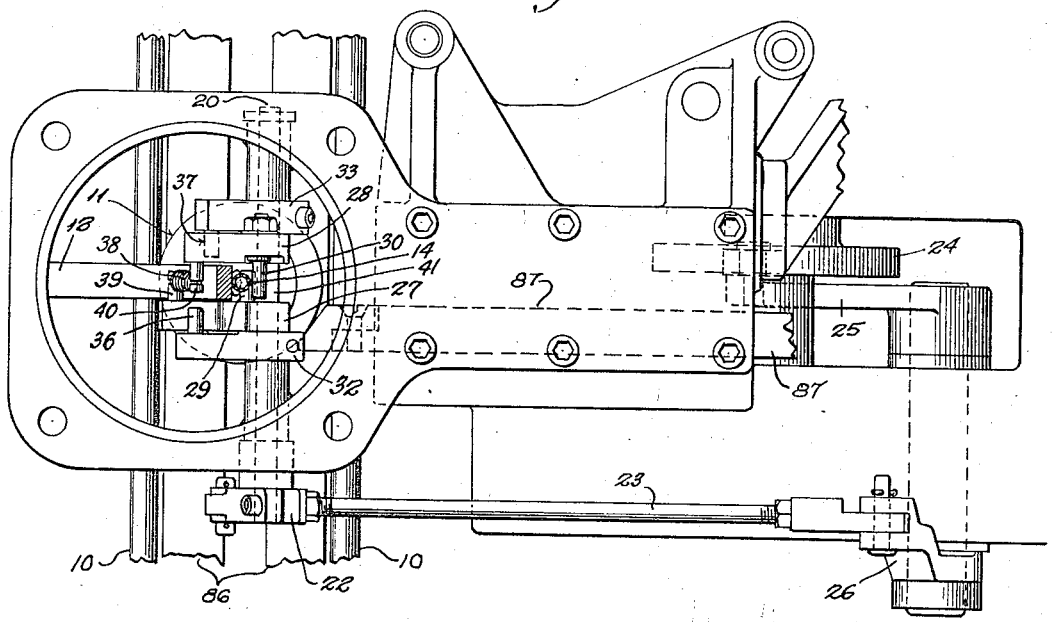
Fig. 2 is a plan view taken along line 2—2 of Fig. 1.

In the form shown in Figs. 1 and 2, the invention will be described as applied to a conventional tracer charging device, but the invention is not to be construed to be limited thereto. Tracks 10, forming part of the machine, may carry dies 11 in which the projectiles are placed. The form of the dies for carrying the projectiles are not described in detail as they are not part of the present invention. Suitable conveyor belts 85 may be located on supports to move the dies 11 and position them underneath the charging device at the proper time. Reciprocating arm 87, driven by suitable cam means (not shown), is provided to stop the die under the charging device. The belt slides under the die when it is stopped by arm 87. The charging device itself is carried by means of the bracket 12 having bushings 13 attached thereto for supporting the collapsible tube 14. The collapsible tube 14 may be of any suitable flexible material, and, preferably, is made of rubber or one of its equivalents. The belt itself may be made of metal and in two pieces as shown.

Adjustably supported on rod 15 are two funnels 16 and 17 for feeding the flowable material thereto. The outlet 18 of the funnel 17 may be inserted in the top of the collapsible tube 14 in any suitable manner. It is seen that funnels 16 and 17, therefore, provide a receptacle for the flowable material which is to be measured and charged. There is a support 19 located on the bracket for supporting the middle of the collapsible tube. A shaft 20 is suitably supported in a frame 21 and has an arm 22 (Fig. 2) fastened thereto. The arm 22 may be suitably operated by the rod 23, which in turn, is reciprocated by cam 24 through the levers 25 and 26. The shaft 20 is thus oscillated as the cam is rotated.

The compressor levers, for closing the collapsible tube, are loosely mounted on shaft 20. The lower compressor lever is seen at 27 and the upper compressor lever at 28. The lower compressor lever 27 has a pin 29 for engagement with the collapsible tube as indicated. The upper compressor lever 28 has a pin 30 for engagement with the collapsible tube. The pin 30 is vertically adjustable in the slot 31 so as to vary the space between the two pins and thereby adjust the quantity which is to be delivered.

There are two arms 32 and 33 which are attached to shaft 20 so as to rotate therewith. These arms may have a bifurcated end 34 with a bolt 35 therethrough for adjustably mounting the same on shaft 20. Arm 32 has a pin or projection 36 for engagement with the outer end of the lower compressor lever 27. Arm 33 has a pin or projection 37 for engagement with the upper compressor lever 28. The compressor levers 27 and 28 are urged to closing positions by spring 38 which is connected to pins 39 and 40 on compressor levers 27 and 28, respectively. When the machine is in the non-charging position, the arms 32 and 33 are adjusted so that pin 37 rocks the upper compressor lever in a clockwise direction and thereby removes pin 30 from contact with the collapsible tube so that the tube is open at its upper end. The pin 36 of arm 32 is free from contact with the lower compressor lever 27, so that the pin 29 of compressor lever 27 is in contact with the collapsible tube and collapses the same at this point. The bracket 12 serves as a backing for the tube so as to assist in the collapsing action.

In this manner, the collapsible tube may fill with the flowable material from the receptacles 16 and 17. Then, as the die 11 moves underneath the tube, the cam 24 will cause reciprocation of arm 23 thereby rocking shaft 20 in a counter-clockwise direction. At the first part of this movement, pin 37 is released from contact with compressor lever 28 so that spring 38 will cause pin 30 to close or pinch off the upper end of the collapsible tube. There will thus be a measured quantity of the material between the pinched-off portions of the collapsible tube.

Then, upon further oscillation of shaft 20, the pin 36 of arm 32 will contact the lower compressor arm 27 and move it in a counterclockwise direction, thereby releasing the measured charge of material in the collapsible tube. This charge will flow from the outer end of the tube into a projectile within the die 11. The lower bracket 13 may have a surface 41 so shaped as to receive the vibratory motion of a suitable rapper or hammer 42.

Figure 4:
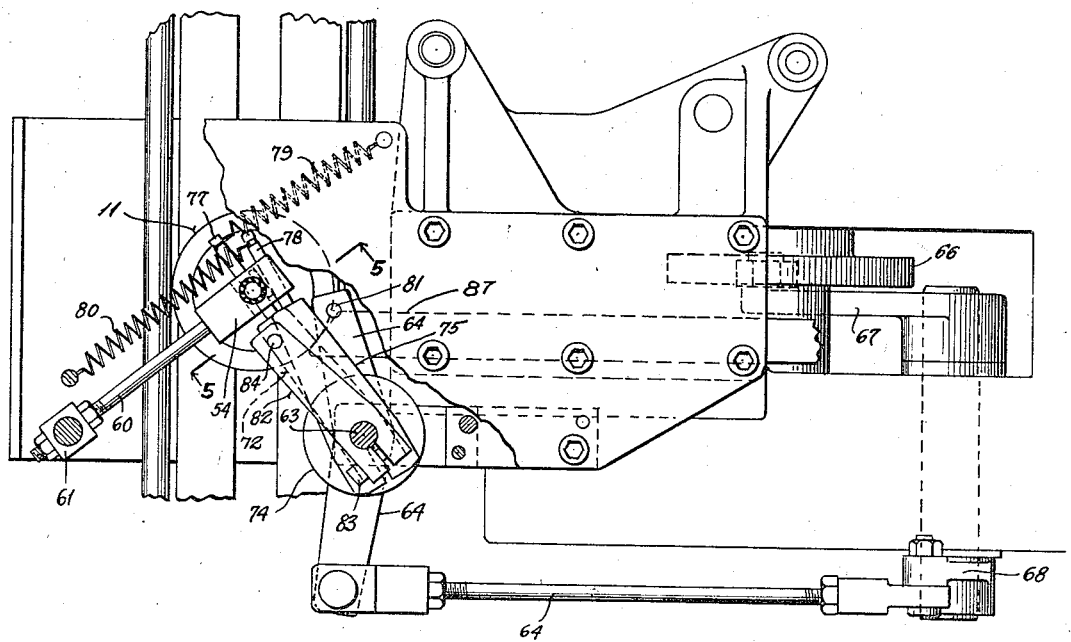
Fig. 4 is a plan view of the form shown in Fig. 3 taken in the direction 4—4 of Fig. 3.

Another form of the invention may be seen in Figs. 3 to 5, inclusive. In some types of material, which are to be charged, the characteristics will be found such that the tube must be made large enough so that the material will flow from the tube with sufficient rapidity to allow proper operation of the machine. With the small quantities involved in charging such items as tracer projectiles, this will result in the compressor levers being very close together.

The modification shown in Figs. 3 to 5 is particularly adaptable for such a condition. It differs from the previous form in that the oscillatable shaft is vertical instead of horizontal and the plane of movement of the compressor levers is perpendicular to the axis of the collapsible tube. 50 and 51 are the receptacles or funnels into which the flowable material is placed in a manner similar to that described in Figs. 1 and 2. 52 is a collapsible tube having one end operatively connected to the receptacle 50.

An S-shaped bracket 53, as seen in Figs. 3 and 5, is provided having aligned bores 54, 55 and 56 therethrough to receive the tube. The portions 57 and 58 serve as a means for supporting the rubber tube when the compressor levers are operative to pinch off the rubber tube. The bracket 53 may be supported by adjustable rods 59 and 60. These rods, in turn, are held by post 61 which is fastened to the frame 62. By the use of the rods 59 and 60, the bracket 53 is supported so as to accentuate the vibratory motion imparted to the bracket 53 so as to aid feeding of the material therethrough.

A shaft 63 has a bell crank lever 64 fastened to the lower end thereof. One arm of the bell crank lever has a rod 65 attached thereto. The rod 65 is reciprocated by cam 66 acting through levers 67 and 68. Spacers 69, 70 and 71 may be provided to properly position the various elements located on the shaft 63. The lower compressor lever is shown at 72. This lever is loosely mounted on the shaft 63. A threaded bushing 73 is loosely mounted on the shaft 63 and has a knurled wheel 74 to facilitate rotation thereof. The upper compressor lever 75 is screw threadedly engaged with the bushing 73 and may have a set screw 76 to locate compressor lever thereon.

The compressor levers 72 and 75 have pins 77 and 78 for bearing against the collapsible tube so as to collapse the same under the urgence of springs 79 and 80, respectively. The bell crank lever 64 has an upstanding projection or pin 81 suitable for engagement with the lower compressor lever 72.

An arm 82 is attached to shaft 63 by means of a bolt 83 passing through the bifurcated end of arm 82. A pin 84 depends from arm 82 for contacting the upper compressor lever 75 when arm 82 is oscillated by shaft 63.

It is noted that the pin 82 is made of sufficient length so as to allow for the vertical adjustment of the upper compressor lever 75. When the device is in non-charging position, spring 79 holds pin 77 against the collapsible tube and collapses the same at this point. The pin 78 of the upper compressor lever 75 is held away from the collapsible tube by pin 84 on the oscillating lever 82.

At the proper time, as the die or holder comes underneath the charging tube, reciprocation of rod 65 by cam 66 will cause rotation of shaft 63 in a counter-clockwise direction (Fig. 4) so as to remove pin 84 from contact with the upper compressor lever 75. Spring 80 then causes pin 78 of the upper compressor lever to collapse the tube and shut off communication with the receptacles 50 and 51.

Upon oscillation of shaft 63, pin 81 is brought into contact with the lower compressor lever 72, thereby releasing the collapsible tube and allowing a charge to flow from the tube 52. It is evident that the compressor levers may be adjusted so as to give the proper timing as desired. This may be increased or decreased and may be adjusted so that one compressor releases the tube immediately after the other compressor collapses the tube.

By the use of the term "free flowable material" it is to be understood that the material may be sluggish in flowing such as a light powder as used in tracer mixtures.

It is to be understood that the specific embodiments of the invention described are typical and illustrative only, and are susceptible to embodiment in a varietty of forms, all falling within the scope of the appended claims.

What is claimed is:

1. In a device for feeding measured quantities of a relatively flowable material to a container, the combination comprising a receptacle with an outlet for supplying the flowable material from the receptacle; a collapsible tube for receiving the material from the receptacle; a shaft; two pivoted levers loosely mounted on said shaft for compressing said tube at spaced points; yielding means to urge said levers into tube closing position; and means to alternately positively move said levers from tube compressing position so as to feed measured quantities of the material from the tube.

2. In a device for feeding measured quantities of a relatively flowable material to a container, the combination comprising a receptacle with an outlet for supplying the flowable material; a collapsible tube for receiving the material from the receptacle; a shaft; upper and lower spaced tube compressor levers adjacent said collapsible tube and loosely mounted on said shaft; means connected to said shaft to alternately operate said upper and lower tube compressors so as to first close off the upper part of the tube and then open the lower part of the tube; and means to adjust the spacing between said tube compressors.

3. In a device for feeding measured quantities of a relatively flowable material to a container, the combination comprising a receptacle with an outlet for supplying the flowable material; a collapsible tube for receiving material from the receptacle; a horizontal shaft; two pivoted levers loosely mounted on said shaft, said levers being engageable with said tube at spaced points; yielding means to urge said levers into tube closing position; means connected to said shaft to alternately positively move one lever at a time from tube closing position; and means to oscillate said shaft so as to feed measured quantities of material from said tube.

4. In a device for feeding measured quantities of a relatively flowable material to a container, the combination comprising a receptacle with an outlet for supplying the flowable material; a collapsible tube operatively connected to said outlet; a horizontal shaft; means to oscillate said shaft; two pivoted levers loosely mounted on said shaft, said levers being engageable with said tube at spaced points; yielding means connected between said levers to urge said levers into tube compressing position; an arm for each lever connected to said shaft to alternately move one lever at a time from tube closing position; and means to feed a measured quantity from said tube.

5. In a device for feeding measured quantities of a relatively flowable material to a container, the combination comprising a receptacle with an outlet for supplying the flowable material; a collapsible tube for receiving material from the receptacle; a vertical shaft; means to oscillate said shaft; two pivoted tube compressors loosely mounted on said shaft, said compressors being engageable with said tube at spaced points; means to vary the distance between said compressors; and means to alternately operate said compressors to feed measured quantities of material from said tube.

6. In a device for feeding measured quantities of a relatively flowable material to a container, the combination comprising a receptacle with an outlet for supplying the flowable material; a collapsible tube for receiving material from said receptacle; a shaft; means to oscillate said shaft; two tube compressors carried by said shaft; a threaded bushing on said shaft upon which one of said tube compressors is adjustably mounted; and an arm for each lever connected to said shaft to alternately move one compressor at a time from tube closing to tube opening position so as to feed a measured quantity of material from said tube.

7. In a device for feeding measured quantities of a relatively flowable material to a container, the combination comprising a receptacle with an outlet for supplying the flowable material; a shaft; a collapsible tube connected to said outlet; means to oscillate said shaft; two tube compressors rotatable on said shaft; yieldable means to urge said compressors into tube closing position; levers mounted on said shaft; an arm for each lever connected to said shaft to alternately move one lever at a time from tube closing position; a bushing loosely mounted on said shaft; one of said tube compressors being threadedly engaged with said bushing so as to be adjustable longitudinally thereof; and means to oscillate said shaft so as to feed a measured quantity of material from said tube.

PHILIP H. BURDETT.
WARREN S. REYNOLDS.
JOHN R. TURNER.